Oct. 12, 1965 F. W. MURPHY 3,210,856

APPARATUS FOR GAGING THE LOCATION OF HOLES IN A WORKPIECE

Filed June 24, 1963 2 Sheets-Sheet 1

INVENTOR
F. W. MURPHY
BY S. Gunderson
ATTORNEY

Oct. 12, 1965 F. W. MURPHY 3,210,856

APPARATUS FOR GAGING THE LOCATION OF HOLES IN A WORKPIECE

Filed June 24, 1963 2 Sheets-Sheet 2

United States Patent Office 3,210,856
Patented Oct. 12, 1965

1

3,210,856
APPARATUS FOR GAGING THE LOCATION OF HOLES IN A WORKPIECE

Francis W. Murphy, Gahanna, Ohio, assignor to Western Electric Company, Incorporated, New York, N.Y., a corporation of New York Filed June 24, 1963, Ser. No. 289,841
2 Claims. (Cl. 33—174)

This invention relates to an apparatus for gaging the location of holes in a workpiece and particularly to an apparatus for locating the position of holes in a memory plane.

In the manufacture of memory planes for electronic switching systems, it is necessary to place the solenoid or conductor tape accurately on the memory plane. Further, in the assembly of the memory planes in a fixture, it is necessary to accurately position the memory planes relative to each other.

The accurate positioning of the memory planes relative to each other and the accurate placing of solenoid tape on the memory plane is accomplished by utilizing reference holes or apertures in the plane. Thus, prior to placing conductor tape on the memory plane, it is essential that it be determined whether the holes or apertures are located on the memory plane within specific tolerance limits.

It is, therefore, a primary object of this invention to provide a gaging apparatus for accurately locating the positions of holes in a workpiece.

A further object of the invention is to provide a gaging apparatus for determining the relative location of holes in a workpiece.

With these and other objects in view, the present invention contemplates the use of a probe or probes which are freely displaceable in the plane of a workpiece and facilities responsive to displacement of the probe or probes for gaging the location of the hole or holes in the workpiece.

Figure 1:
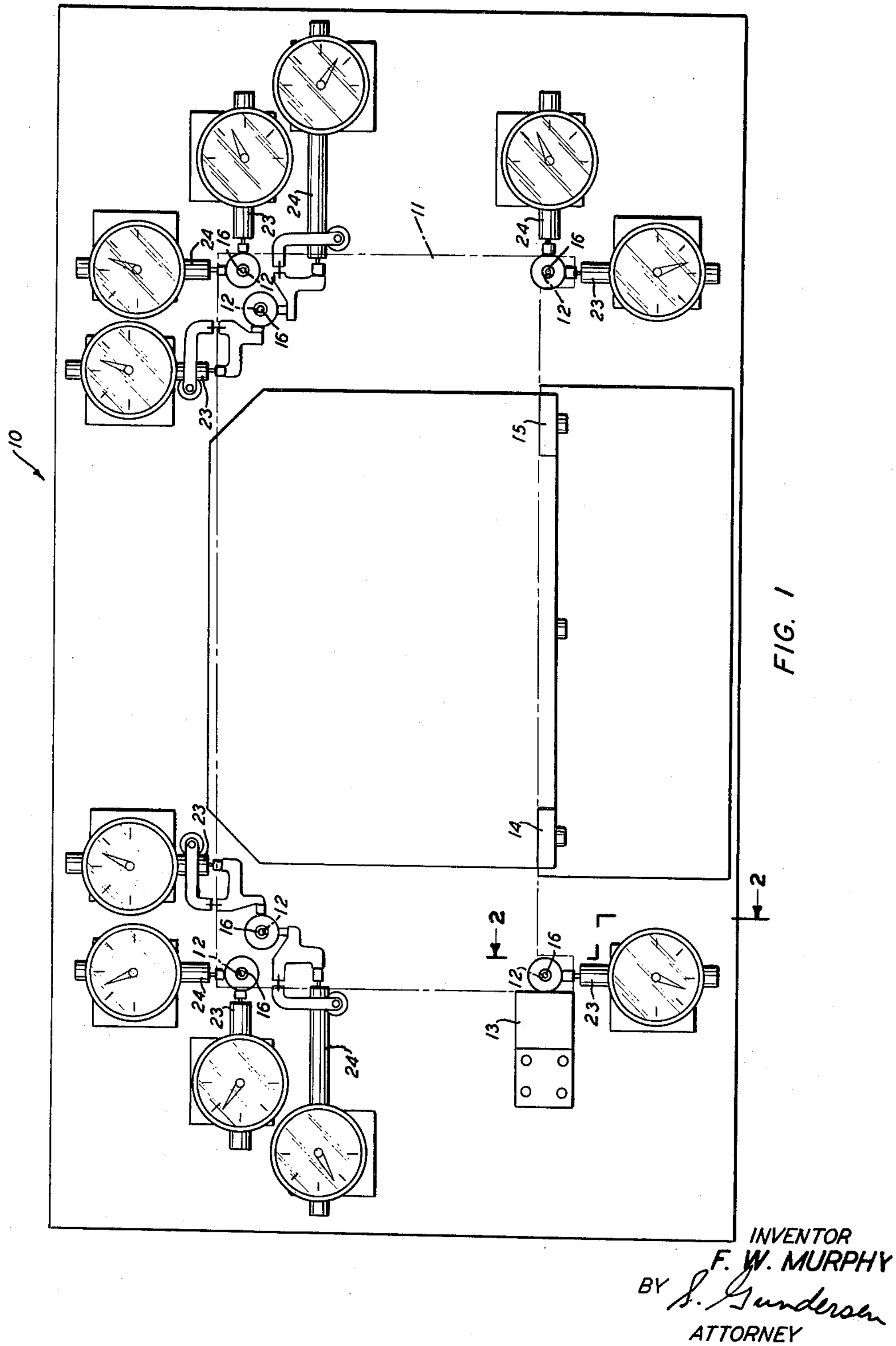
Figure 2:
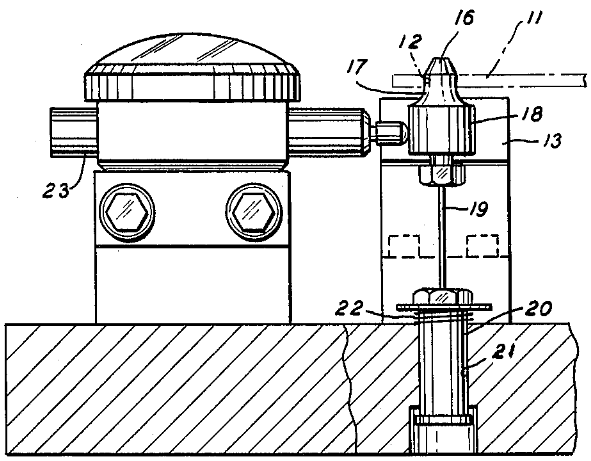

A complete understanding of the invention may be obtained from the following detailed description when read in conjunction with the appended drawings, in which:

FIG. 1 is a top view of an apparatus embodying the principles of the invention, and FIG. 2 is a sectional view of FIG. 1 taken along the lines 2—2.

Referring to FIG. 1, a gaging apparatus is generally indicated by the numeral 10. A memory plane 11 is shown in phantom on the gaging apparatus 10. The memory plane 11 is provided with apertures 12. The apertures 12 are utilized for accurately positioning the memory planes so as to insure that the parallel strips of solenoid or conductor tape (not shown) on each plane will coincide with the strips of conductor tape on the other planes when mounted in a fixture (not shown). Stops 13, 14 and 15 are provided for accurately positioning the plane on the gaging apparatus 10. A plurality of probes or feelers 16 are mounted on the gaging apparatus for insertion in the holes of the plane 11 when the plane is properly positioned by the stops 13, 14 and 15.

As seen in FIG. 2, the probes 16 are provided with a tip 17 having a generally frustoconical shape. The probes 16 also have a cylindrical body portion 18. The probes 16 are mounted on a segment of music wire 19 and the opposite end of the music wire 19 is retained in a mounting fixture 20. The fixture 20 is slideably mounted in an aperture 21 of the gaging apparatus 10 and is spring biased by spring 22 so as to permit limited axial displacement of the probes 16.

Each of the probes 16 cooperates with mutually perpendicular gages 23 and 24. Thus, any displacement of the probes 16 will register on the gages 23 and

2

24 so that the exact location of the probes may be ascertained.

In operation a master plane is placed on the gaging machine 10 and the gages 23 and 24 are set to read zero. This, in effect, calibrates the gaging apparatus in preparation for locating the holes in a test plane 11.

As the test plane 11 is placed over the probes and positioned by the stops 13, 14 and 15, the probes 16 will be displaced axially so as to set the tips 17 of the probes 16 in the apertures of holes 12 of the plane 11. Any deviation of the location of the holes 12 in the plane 11 from that of the location of the holes in the calibrating master will result in a lateral displacement of the probes or probe 16. This displacement will actuate the gages 23 and 24 so as to indicate the degree of deviation of the position of the holes in the board 11 from that of the calibrating master. Thus, it can readily be determined whether the test plane is acceptable for further manufacturing operations in the process of manufacturing memory planes.

It is not essential that the stops 13, 14 and 15 be provided. As will be noted in FIG. 1, the probe 16 adjacent the stop 13 is provided with only a single gage 23. This is possible as the stop 13 does not abut with memory plane 11 but with the cylindrical portion 18 of the probe 16 (FIG. 2). By providing an additional gage for the probe 16 acting at 90° to the gage, the stop 13 can be eliminated. Thus, instead of the gages giving an indication of the displacement of the holes from a given line, as defined by stop 13, the gages will give the relative displacement of the holes from each other.

In the absence of stops, the master would be placed on the probes and a reading taken from each gage. This, in effect, would calibrate the gaging apparatus. A test plane would then be placed on the probes and the gages read. A comparison of the gage readings from the test plane with those of the master would indicate the location of the holes of the test plane relative to the holes of the master.

The advantage in using the stops is that a direct reading is obtained without the necessity of any calculations.

As seen in FIG. 1, to calibrate the gaging apparatus, the master is placed on the probes 16 and the master is displaced until the cylindrical surface 18 of probe 16 abuts against the stop 13 and the master abuts against the stops 14 and 15. All of the gages are then set to read zero with the master in this position.

In detecting any variation between the holes of a test plane and the holes of the master, the test plane is placed on the probes 16, cylindrical surface 18 of the probe 15 is abutted against stop 13 and the test plane is abutted against stops 14 and 15. A reading is then taken on the gages.

If any of the holes of the test plane do not coincide with the holes of the master, one or more of the probes 16 will be displaced on the music wire 19 in the plane of the memory plane 11. As the probes 16 are displaced, the gages 23 and 24 are actuated. Thus, by reading the gages, the location of the holes in the memory plane under test is determined.

It will be understood that the above-described embodiment is merely illustrative of the principles of the invention and that various modifications and embodiments of the invention may be made within the spirit and scope thereof.

What is claimed is:

1. A device for gaging the location of holes in a workpiece, comprising;

a probe having a generally frustoconical tip and cylindrical body, a resilient segment of wire carrying the probe on one end so that the probe is freely displaceable in the plane of the workpiece, a spring-biased member retaining the other end of the wire so as to permit free axial displacement of the probe perpendicular to the plane of the workpiece whereby the probe is seated in a hole in the workpiece, two stops arranged at right angles to each other so as to position the workpiece relative to the probe, and two gages acting perpendicular to each other parallel to the plane of the workpiece and cooperating with the cylindrical body of the probe so as to gage the location of the hole in the workpiece in response to displacement of the probe.

2. A device for gaging the location of holes in a workpiece, comprising:

at least two probes, each probe having a generally frustoconical tip and cylindrical body, a resilient segment of wire having the probe mounted on one end so that the probe is freely displaceable in the plane of the workpiece, a spring-biased member for each of the probes retaining the other end of the wire so as to permit free axial displacement of the probes perpendicular to the plane of the workpiece whereby the probes are seated in the holes of the workpiece, two stops arranged at right angles to each other so as to position the workpiece relative to the probes, and two gages cooperating with the cylindrical body of each probe, the two gages being at right angles to each other and parallel to the plane of the workpiece so as to gage the location of the holes in the workpiece in response to displacement of the probes.

References Cited by the Examiner

UNITED STATES PATENTS

| | | | |
|---|---|---|---|
| 2,697,880 | 12/54 | Tandler | 33—174 |
| 2,749,673 | 6/56 | Balsiger | 33—181 X |
| 2,878,572 | 3/59 | Mahlmeister | 33—174 |
| 2,911,727 | 11/59 | Steinhart | 33—174 |
| 3,094,788 | 6/63 | Mahlmeister | 33—174 |

LOUIS R. PRINCE, *Primary Examiner.*

LEONARD FORMAN, *Examiner.*